United States Patent [19]

Takaki et al.

[11] Patent Number: 5,292,821
[45] Date of Patent: Mar. 8, 1994

[54] CATONIC ACRYLAMIDE POLYMERS AND THE APPLICATIONS OF THESE POLYMERS

[75] Inventors: Toshihiko Takaki; Kenji Tsuboi; Hiroshi Itoh; Atsuhiko Nitta, all of Kanagawa, Japan

[73] Assignee: Mitsui Toatsu Chemicals, Inc., Tokyo, Japan

[21] Appl. No.: 82,773

[22] Filed: Jun. 28, 1993

Related U.S. Application Data

[62] Division of Ser. No. 725,611, Jul. 3, 1991, Pat. No. 5,239,014, which is a division of Ser. No. 454,526, Dec. 21, 1989, Pat. No. 5,039,757.

[30] Foreign Application Priority Data

| Dec. 28, 1988 | [JP] | Japan | 63-328902 |
| Feb. 21, 1989 | [JP] | Japan | 1-42179 |
| Feb. 21, 1989 | [JP] | Japan | 1-42180 |

[51] Int. Cl.$^5$ ............................................. C08F 8/20
[52] U.S. Cl. ........................... 525/328.4; 525/329.2; 525/329.4; 525/355; 525/383
[58] Field of Search ................. 525/328.4, 329.2, 329.4

[56] References Cited

U.S. PATENT DOCUMENTS

| 3,366,639 | 1/1968 | Haefele . |
| 3,929,744 | 12/1975 | Wright et al. . |
| 4,110,520 | 8/1978 | Miyajima . |
| 4,785,055 | 11/1988 | Dexter et al. . |
| 4,789,703 | 12/1988 | Fabris et al. . |

FOREIGN PATENT DOCUMENTS

| 51-122188 | 10/1976 | Japan . |
| 52-152493 | 12/1977 | Japan . |
| 53-109594 | 9/1978 | Japan . |
| 54-145790 | 11/1979 | Japan . |
| 55-6556 | 1/1980 | Japan . |
| 56-144295 | 11/1981 | Japan . |
| 57-165404 | 10/1982 | Japan . |
| 57-192408 | 11/1982 | Japan . |
| 58-108206 | 6/1983 | Japan . |
| 58-152004 | 9/1983 | Japan . |
| 61-120807 | 6/1986 | Japan . |
| 61-200103 | 9/1986 | Japan . |
| 62-59602 | 3/1987 | Japan . |

OTHER PUBLICATIONS

Kobunshi Ronbunshu, vol. 33, No. 6, pp. 309–316 Jun. 1976.

*Primary Examiner*—Bernard Lipman
*Attorney, Agent, or Firm*—Burns, Doane, Swecker & Mathis

[57] ABSTRACT

This invention provides cationic acrylamide polymers which are highly effective as paper strength agents, drainage agents and suspension flocculants, and which do not show much temporal deterioration; it also provides a method of manufacturing said polymers wherein the manufacturing equipment is compact and can be installed on site, and the cationicity of the polymers can be modified in a short time.

This invention comprises a method of manufacturing cationic acrylamide polymers by reaction, with a hypohalogenite, of a (meth)acrylamide homopolymer, a copolymer of (meth)acrylamide and acrylonitrile, a copolymer of (meth)acrylamide and, N,N-dimethylacrylamide, in a high temperature range of 50°–110° C. for a short time; the polymers manufactured by said process; and paper strength agents, drainage agents and flocculants having these polymers as their principal constituent.

15 Claims, No Drawings

CATONIC ACRYLAMIDE POLYMERS AND THE APPLICATIONS OF THESE POLYMERS

This application is a divisional of application Ser. No. 07/725,611, filed Jul. 3, 1991, now U.S. Pat. No. 5,239,014, which is a divisional of application Ser. No. 07/454,526, filed on Dec. 21, 1989, now U.S. Pat. No. 5,039,757 issued on Aug. 13, 1991.

BACKGROUND OF THE INVENTION (1) Field of the Invention

This invention relates to a method of manufacturing cationic acrylamide polymers mainly used as paper strength agents and flocculants, said polymers, and the applications of these polymers. More specifically, it relates to ca&ionic acrylamide polymers obtained by carrying out a Hofmann degradation reaction on acrylamide polymers at high temperature for a short time, their method of manufacture and the applications of these polymers.

(2) Description of the Prior Art

Examples of cationic acrylamide polymers (acrylamide polymers are hereafter referred to simply as polyacrylamides) known in the prior art are Hofmann decomposition polyacrylamides, Mannich polyacrylamides, and copolymers of cationic monomers and acrylamides. Some of these polymers have various uses such as paper strength agents and flocculants, while the use of others is being considered.

Hofmann decomposition polyacrylamides have excellent properties not shared by Mannich polyacrylamides and copolymers of cationic monomers, however they lose their cationicity over a period of time in aqueous solution, and their use has therefore been limited.

Various means have been considered to improve the characteristics of these polymers. One such means is to carry our the Hofmann decomposition of polyacrylamides at low temperature in order to suppress side reactions and thereby suppress temporal deterioration. It is reported for example in "Kobunshi Ronbun", Vol. 33, No. 6, pp. 309–316, 1976, that in the Hofmann decomposition of polyacrylamides, substitution of amino groups can occur easily even at low temperature due to the reaction promoting effect of neighbouring groups, and it is also disclosed that to suppress side reactions (such as hydrolysis and formation of lactam rings) and depolymerizations, it is desirable to carry out the reaction at a low temperature of the Order of 25° C. or less to obtain amino-substituted PAM (polyacrylamides) with high performance. The advantage of carrying out the Hofmann reaction of polyacrylamides at low temperature is also reported in Japanese Laid-Open Patent Application Nos. 61-200103, 58-152004, 58-108206, 57-165404, 55-6556, 52-152493 and 51-122188.

However, according to tests performed by the inventors of the present invention, it was found that merely carrying out the Hofmann reaction at low temperature does not improve the temporal variation to such an extent as to permit commercial application of the polymers. In another approach, hydroxyl-substituted compounds into which cationic groups have been substituted such as quaternary ammonium salts, or N,N-dialkyl substituted diamines, guanidine and polyamines are also present when the Hofmann decomposition is carried out, and these substances are made to react with isocyanate intermediates of the Hofmann decomposition so as to incorporate them in the polymer, thereby preventing temporal variation from occurring, as disclosed in Japanese Laid-Open Paten±Application Nos. 62-59602, 61-120807, 57-192408, 56-144295, 54-145790 and 53-109594. According to the present inventors, however, these methods have still not given satisfactory results.

SUMMARY OF THE INVENTION

An object of this invention is to provide cationic acrylamide polymers which are highly effective as paper strength agents and suspension flocculants, and cationic acrylamide polymers with little temporal deterioration. Another object of this invention is to provide a method of manufacturing said polymers wherein the reaction vessels are more compact and can be installed on site, and the degree of cationicity can be modified in a short time.

This invention is a method of manufacturing cationic acrylamide polymers which includes reaction of acrylamide polymers with a salt of hypohalogenous acid (hereafter referred to as "hypohalogenite") under alkaline conditions in the temperature range 50°–110° C. over a short period of time (0.001 sec–10 min), and the cationic acrylamide polymers manufactured by this method.

This invention is also a method of manufacturing cationic acrylamide polymers which includes reaction of acrylamide polymers with a hypohalogenite under alkaline conditions in the temperature range 50°–110° C. over a short period of time (0.001 sec–10 min), wherein said acrylamide polymers contain (a) 97–60 mol % of (meth)acrylamide units (97.7–66.8 weight % of acrylamide, or 98.1–70.6 weight % of methacrylamide), and (b) 3–40 mol % of acrylonitrile units (2.3–33.2 weight % in case of acrylamide and 1.9–29.4 weight % in case of methacrylamide).

This invention is also a method of manufacturing cationic acrylamide polymers which includes reaction of acrylamide polymers with a hypohalogenite under alkaline conditions in the temperature range 50°–110° C. over a short period of time (0.001 sec–10 min), wherein said acrylamide polymers contain (a) 97–60 mol % of (meth)acrylamide units (97.7–66.8 weight % of acrylamide, or 98.1–70.6 weight % of methacrylamide), and (b) 3–40 mol % of N,N-dimethyl (meth)acrylamide units (2.3–23.2 weight % in case of acrylamide and 1.9–29.4 weight % in case of methacrylamide).

It is preferable that after carrying out said reaction, reducing agents are added or the temperature is lowered (50° C. or less) within a short time, or the pH is adjusted to 5 or less to stop the reaction.

It is also preferable that the reactants are added in alcohols, and the polymers are precipitated.

This invention is also a drainage agent, paper strength agent or flocculant with said cationic acrylamide polymer as its principal component, methods of using these agents in these applications, and paper which has been strengthened by said polymers.

DETAILED DESCRIPTION OF THE INVENTION

In view of the above problems, the inventors considered the Hofmann degradation of polyacrylamides in detail. It was found that cationic polyacrylamides with far superior properties to Hofmann polyacrylamides manufactured by a low temperature reaction, and with properties equivalent to or better than cationic polyacrylamides manufactured by a low temperature reaction over a very long period time, could be obtained by carrying out the Hofmann reaction at high temperature over a very short period of time, a result which had hitherto been totally unexpected. This discovery led to the present invention.

This invention basically provides a method of manufacturing cationic acrylamide polymers characterized by reaction of acrylamide polymers with a hypohalogenite under alkaline conditions in the temperature range 50°-110° C. over a short period of time (for example, 0.001 sec-10 min).

Further, this invention makes possible the design of a totally new system for manufacturing cationic polyacrylamides. The use of this manufacturing system avoids problems of temporal deterioration of Hofmann degradation polyacrylamides, and opens up a wide range of new applications.

This invention also provides a method of manufacturing a cationic polyacrylamide copolymer obtained by reacting an acrylamide copolymer containing (a) 97–60 mol % of (meth)acrylamide units, and (b) 3–40 mol % of acrylonitrile units, with a hypohalogenite under alkaline conditions; provides the polymer manufactured by this method: and provides a strength agent having this polymer as active constituent which increases paper internal bond strength (the internal bond strength of the paper refers to its strength in the direction of the thickness of the paper) and inter-layer paper strength.

The acrylamide copolymer used in this second invention is a Hofmann rearrangement product obtained by reacting an acrylamide copolymer containing 3–40 mol of acrylonitrile units %, more preferably 5–30 mol % of acrylonitrile units, with a hypohalogenite under alkaline conditions. If the acrylonitrile groups account for less than 3 mol %, the effect of acrylonitrile copolymerization is insufficient, that is the C.S.F. (Canadian Standard Freeness) value is not sufficiently large and the paper internal bond strength is quite inadequate. If on the other hand it exceeds 40 mol %, it interferes with water solubility so that the C.S.F. value and paper internal bond strength are even worse.

This invention also provides a method of manufacturing a cationic polyacrylamide copolymer obtained by reacting an acrylamide copolymer containing (a) 97–60 mol % of (meth)acrylamide units, and (b) 3–40 mol % of N,N-dimethyl (meth)acrylamide units, with a hypohalogenite under alkaline conditions; provides the co-polymer manufactured by this method; and provides a paper strength agent having this co-polymer as active constituent which increases paper internal bond strength and inter-layer paper strength.

In this case, the acrylamide copolymer used is a Hofmann rearrangement product obtained by reacting an acrylamide copolymer containing 3–40 mol %, preferably 5–30 mol %. of N,N-dimethyl (meth)acrylamide units, with a hypohalogenite under alkaline conditions. If the N,N-dimethyl (meth)acrylamide units account for less than 3 mol %, the effect of N,N-dimethyl (meth)acrylonitrile copolymerization is insufficient, that is the C.S.F. value is not sufficiently large and the paper internal bond strength is quire inadequate. If on the other hand it exceeds 40 mol %, it interferes with water solubility so that the C.S.F. value and paper internal bond strength are even worse.

We shall now explain this invention in more detail.

The acrylamide polymer (polyacrylamide) used hereinafter in this invention means a homopolymer of an acrylamide (or methacrylamide), said acrylamide copolymer of a (meth)acrylamide and acrylonitrile, said acrylamide copolymer of a (meth)acrylamide and a N,N-dimethyl (meth)acrylamide, a copolymer of an acrylamide (or methacrylamide) or of an acrylamide copolymer with at least one type of unsaturated monomer capable of copolymerization, or a copolymer obtained by grafting onto a water-soluble polymer such as starch.

Examples of monomers capable of copolymerization are hydrophilic monomers, ionic monomers or lipophilic monomers, one or more of which may be used. More specifically, examples of hydrophilic monomers are diacetone acrylamide, N,N-dimethyl methacrylamide, N-ethyl methacrylamide, N-ethyl acrylamide, N,N-diethyl acrylamide, N-propyl acrylamide, N-acrylcyl pyrolidine, N-acryloyl piperidine, N-acryloyl morpholine, hydroxyethyl methacrylate, hydroxyethyl acrylate, hydroxypropyl methacrylate, hydroxypropyl acrylate, various kinds of methoxypolyethyleneglycol (meth)acrylates, and N-vinyl-2-pyrolidone.

Examples of ionic monomers are acids such as acrylic acid, methacrylic acid, vinyl sulfonic acid, aryl sulfonic acid, methallyl sulfonic acid, styrene sulfonic acid, 2-acrylamide-2-phenylpropane sulfonic acid, 2-acrylamide-2-methylpropane sulfonic acid and their salts, and amines such as N,N-dimethylaminoethyl methacrylate, N,N-diethylaminoethyl methacrylate, N,N-dimethylaminoethyl acrylate, N,N-dimethylaminopropyl methacrylamide, N,N-dimethylaminopropyl acrylamide, and their salts.

Examples of lipophilic monomers are N-alkyl (meth)acrylamide derivatives such as N,N-di-n-propyl acrylamide, N-n-but? I acrylamide, N-n-hexyl acrylamide, N-n-hexyl methacrylamide, N-n-octyl acrylamide, N-n-octyl methacrylamide, N-tert-octyl acrylamide, N-dodecyl acrylamide and N-n-dodecyl methacrylamide; N-($\omega$-glycidoxyalkyl) (mech)acrylamide derivatives such as N,N-diglycidyl acrylamide, N,N-diglycidyl methacrylamide, N-(4-glycidoxybutyl) acrylamide. N-(4-glycidoxybutyl) methacrylamide, N-(5-glycidoxypentyl) acrylamide, and N-(6-glycidoxyhexyl) acrylamide; (meth)acrylate derivatives such as methyl (meth)acrylate, ethyl (meth)acrylate, butyl (meth)acrylate, lauryl (meth)acrylate, 2-ethylhexyl (meth)acrylate and glycidyl (meth)acrylate; olefins such as methacrylonitrile, vinyl acetate, vinyl chloride, vinylidene chloride, ethylene, propylene and butene; and styrene, divinylbenzene, $\alpha$-methyl styrene, butadiene and isoprene. The quantity of unsaturated monomers used in the copolymerization depend on their types and combinations, but it is in the general range 0–50 weight %, and more preferably 0.01–50 weight %.

The water-soluble polymers with which said monomers are graft copolymerized may be natural or synthetic. Examples of suitable natural polymers are starches of different origin and modified starches such as oxidized starch, carboxylated starch, dialdehyde starch and cation-modified starch, cellulose derivatives such as methyl cellulose, ethyl cellulose, carboxymethyl cellulose and hydroxyethyl cellulose; and alginic acid, agar, pectin, carrageenan, dextran, pururan, arum root, Arabia rubber, casein and gelatin. Examples of suitable synthetic polymers are polyvinyl alcohol, polyvinyl ether, polyvinyl pyrrolidone polyethylene imine, polyethylene glycol, polypropylene glycol, polymaleic acid copolymers, polyacrylic acid and polyacrylamides. The quantity of said monomers to be added to the above water-soluble polymers is 0.1-10 times the quantity of the polymers.

Next, said monomers are polymerized to manufacture polyacrylamides, and it is preferable that the method used is radical polymerization. The solvent used may be a polar solvent such as water, alcohols or dimethylformamide, but as the Hofmann reaction is carried out in an aqueous solution, polymerization in water solution is preferable. The concentration of monomer is 2-30 weight %, preferably 5-30 weight %. Any initiator may be used provided it is water-soluble, and it is normally dissolved in an aqueous solution of the monomer. More specifically, it may be a peroxide type such as ammonium persulfate, potassium persulfate, hydrogen peroxide or tert-butyl peroxide. The initiator may be used alone, however it may also be used in conjunction with a reducing agent as a redox type polymerizer. Examples of suitable reducing agents are sulfites, bisulfites, lower order ionized salts of iron, copper and cobalt, organic amines such as N,N,N',N'-tetramethyl ethylenediamine and aniline, and reducing sugars such as aldose and ketose.

Azo compounds may also be used such as hydrochlorides of 2,2'-azobis-2-amidinopropane, 2,2'-azobis-2,4-dimethylvaleronitrile, and 4,4'-azobis-4-cyanovaleric acid or its salts. Further, two or more of the above polymerization initiators may be used in conjunction. Further, if a graft polymerization is carried out on water-soluble polymers. transition metal ions such as ceric ion and ferric ion may also be used apart from said initiators, or in conjunction with them. The quantity of initiator added is usually 0.1-10 weight %, preferably 0.2-8 weight % based on the monomer. Further, in the case of a redox type initiator, the quantity of reducing agent added is usually 0.1-10.0%, preferably 0.2-8.0%, on a molar basis.

The polymerization temperature when a single initiator is used is of the order of 30°-90° C.; when a redox type initiator is used, it is lower and of the order of 5°-50° C. Further, there is no need to maintain the temperature constant during the polymerization, and it may be varied conveniently as the reaction proceeds. In general, it rises due to the heat of polymerization which is liberated. Any atmosphere may be used in the polymerization vessel, but in order to make the polymerization proceed more rapidly, it is better to replace it with an inert gas such as nitrogen. There is no particular limitation on the polymerization time, but it is of the order of 1-20 hours.

In this way, a poly(meth)acrylamide is obtained. In the case of a copolymer of (meth)acrylamide units and acrylonitrile units, the acrylamide copolymer obtained is a water-soluble polymer containing 97-60 mol % of (meth)acrylamide units, and 3-40 mol % of acrylonitrile units. The viscosity of a 10% aqueous solution of this copolymer at 20° C. as measured by a Brookfield viscometer is 100-100,000 cps, but generally it preferably is in the range 100-80,000 cps. It is preferably no less than 100 cps in order to attain a satisfactory performance, while on the other hand it is preferably no greater than 80,000 cps to prevent difficulty in handling and prevent gelation from occurring easily.

In the case of a copolymer of (meth)acrylamide units and N,N-dimethyl(meth)acrylamide units, the acrylamide copolymer obtained is a water-soluble polymer containing 97-60 mol % of (meth)acrylamide units, and 3-40 mol % of N,N-dimethyl(meth)acrylamide units. The viscosity of a 10% aqueous solution of this copolymer at 20° C. as measured by a Brookfield viscosimeter is 100-100,000 cps, but generally it preferably is in the range 100-80,000 cps. It is preferably no less than 100 cps in order to attain a satisfactory performance, while on the other hand it is preferably no greater than 80,000 cps to prevent difficulty in handling and prevent gelation from occurring easily.

Next, a Hofmann decomposition reaction is carried out on the polyacrylamide manufactured by the above method In the case where the manufacture of the polyacrylamide starting material is carried out in aqueous solution, the solution may be used for the reaction without dilution or may be diluted if necessary. Further, in the case of a graft copolymer, ungrafted polyacrylamide is also produced as a by-product, but usually this is not separated and is used for the reaction without modification.

The Hofmann degradation is carried out under alkaline conditions, that is, the hypohalogenite is made to act on the amide groups of the polyacrylamide in the presence of an alkaline substance. Examples of hypohalogenous acids are hypochlorous acid, hypobromous acid and hypoiodous acid. Examples of hypochlorite are alkali metal or alkaline earth metal salts of hypochlorous acid, and more specifically, sodium hypochlorite, potassium hypochlorite, lithium hypochlorite, calcium hypochlorite, magnesium hypochlorite and barium hypochlorite. Similarly, examples of hypobromous acid salts and hypoiodous acid salts are alkali metal and alkaline earth metal salts of hypobromous acid and hypoiodous acid. A halogen gas can also be bubbled into an alkaline solution to generate the hypohalogenite.

Examples of suitable alkaline substances are alkali metal hydroxides, alkaline earth metal hydroxides and alkali metal carbonates. Of these, it is preferable to use an alkali metal hydroxide such as sodium hydroxide, potassium hydroxide or lithium hydroxide. The quantity of the above substances to be added to the polyacrylamide is, in the case of the hypohalogenite, usually 0.05-2 moles preferably 0.1-1.5 moles with respect to amide groups, and in the case of the alkaline substance, usually 0.05-4.0 moles but more preferably 0.1-3.0 moles with respect to amide groups. Further, the molar ratio of the alkaline substances added is 0.5-50, more preferably 0.1-10. and most preferably 1.5-5.0. based on the hypohalogenite. In calculating this molar ratio, there is no problem if alkaline substances contained in the hypohalogenite are not considered. The range of alkalinity, that is the range of pH, is about 11-14. The alkalinity of the mixed solution of said hypohalogenite and alkaline substance, may be adjusted by adding a specified quantity of halogen to and reacting it with an aqueous solution of a specified concentration of the alkaline substance. More specifically, an aqueous caustic soda solution of sodium hypochlorite may be prepared by bubbling a specified quantity of chlorine gas into and reacting it with an aqueous solution of caustic soda of specified concentration. This reaction may be carried out under the normal conditions, there being no special restrictions.

Under the above conditions, the concentration of polyacrylamide is of the order of 0.1-17.5 weight %, however as stirring becomes difficult and gelation occurs easily when the reaction concentration increases, it is normally preferable that it is 0.1-10 weight %. Further, if the reaction concentration is less than 1%, the rate of the reaction is slow, and it is therefore more preferably 1-10 weight %.

The reaction temperature is usually in the range 50°–110° C., preferably 60°–100° C.

In this invention, the Hofmann decomposition is then carried our in the above temperature range for a short time. The reaction time may vary depending on the reaction temperature, and on the polymer concentration of the reaction solution. As examples, when the polymer concentration is about 1–10 weight %, it is sufficient to allow a reaction time of ten or more minutes at 50° C., of several minutes at 65° C., and of several tens of seconds at 80° C. If however the polymer concentration is higher, the reaction is completed in a shorter time. Within the above concentration range, the dependence of reaction time on reaction temperature is expressed by the following two relations for reaction time t. If the reaction is carried out within the specified limits, good results are obtained, and these limits is therefore respected:

$$t_{(sec)} \leq e^{\frac{15,150}{273+T}} \times 10^{-18} + 30 \quad (1)$$

$$t_{(sec)} \geq e^{\frac{15,150}{273+T}} \times 2.5 \times 10^{-20} \quad (2)$$

where $T$ is reaction temperature (°C.) and
$$50 \leq T \leq 110$$

According to these relations between reaction time and temperature, the reaction rime is 5.9 sec to 4.4 min at 50° C., and $4 \times 10^{-3}$ sec to 35 sec at 110° C. In the range 50°–110° C., therefore, the reaction is carried out for 0.001 sec to 10 min The number of cation equivalents of the cationic polyacrylamide manufactured under the above conditions, when determined by colloid titration at pH 2. is of the order of 0–10.0 meq/g, and by adjusting the quantity of hypohalogenite which is added, said number of equivalents can be controlled. Further, as the reaction is carried out under alkaline conditions, the amide groups are also hydrolysed to produce carboxyl groups as by-products. The quantity of the by-products may be expressed in terms of anion equivalents determined by colloid titration at pH 10, and is of the order of 0–10.0 meq/g. The quantity of by-products can moreover be controlled by adjusting the quantity of alkaline substance added.

After carrying out the reaction under the above conditions, in this invention, it is preferable that the reaction be stopped to suppress the progress of side reactions. If however the product is to be used in the applications described below immediately after the reaction, it is not essential to stop the reaction.

The reaction may be stopped by (1) adding a reducing agent, (2) cooling to a low temperature, or (3) lowering the pH of the solution by adding acid, these methods either being used independently or in combination.

In method (1), residual hypohalogenite is rendered inactive by reaction with the reducing agent. Examples of suitable reducing agents are sodium sulfite, sodium thiosulfate, ethyl malonate, thioglycerol and triethylamine. The quantity of reducing agent used is normally 0.005–0.15 molar times, preferably 0.01–0.10 molar times, the quantity of hypohalogenite used in the reaction. In general, when a Hofmann decomposition reaction is complete, residual compounds with active chlorine such as unreacted hypohalogenite remain. As these compounds can cause rusting of paper-making machines when said reaction solution is used as a paper strength agent, active chlorine is usually rendered inactive by a reducing agent. However, if the reaction is carried out with a less molar equivalents of hypohalogenite than the number of molar equivalents of polyacrylamide units, and the reaction is moreover carried out at high temperature, practically no unreacted hypohalogenite remains when the reaction is complete. If therefore these conditions are chosen, the solution may also be used as a paper strength agent without rendering the active chlorine inactive by means of a reducing agent.

In method (2), the progress of the reaction is suppressed by cooling, for example cooling by the use of a heat exchanger, or by diluting with cold water. The cooling temperature is normally no higher than 50° C., preferably no higher than 45° C., and more preferably no higher than 40° C. There is no lower limit to the temperature, but it is preferable that the temperature be above the freezing point ($-20°$ C.).

In method (3), the Hofmann decomposition is stopped by using acid to lower the pH of the solution which normally has an alkalinity of pH 12–13 when the reaction is complete, and at the same time, the progress of hydrolysis reactions is stopped. The pH after addition of acid should be no higher than neutral, and preferably in the range 4–6. Examples of acids that may be used to adjust the pH are mineral acids such as hydrochloric acid, sulfuric acid, phosphoric acid and nitric acid, and organic acids such as formic acid, acetic acid and citric acid. Any of these methods of stopping the reaction, (1)–(3), may be chosen depending on the reaction conditions, and they may moreover also be used in conjunction.

In this invention, the reaction solution may, after the reaction has been stopped by the above methods, be used as an aqueous solution of a cationic polyacrylamide without modification. Alternatively, it may be introduced into a solvent such as methanol which does not dissolve cationic polyacrylamide to precipitate the polymer, and the polymer dried to give a powder. Further, said aqueous solution of cationic polyacrylamide obtained by the above method, may be stored in a tank, and used as necessary. In this case, the storage temperature should be low without being low enough to freeze the aqueous solution, and should preferably be in the range 10°–15° C. If however it is to be used in a relatively short time, it may be stored at ambient temperature, and can then be kept for about one month.

As described above, the cationic polyacrylamide of this invention can be manufactured in a very short time, and the manufacturing equipment can therefore be installed on site near where the polyacrylamide is to be used. This is an important advantage of the present invention. Further, if the reaction is carried out under conditions such that the quantity of hypohalogenite used is less than that of the amide groups of the polyacrylamide, there will be no free hypohalogenous ions in the solution. In this case, the solution can be added to, for example, pulp slurry without stopping the reaction.

The cationic polyacrylamide manufactured in this invention can be applied to fields in which water-soluble cationic polymers are usually used, the main ones being those of chemical additives used in paper-making or flocculants. As chemical additives, cationic polymers find various applications in the paper-making process. The cationic polyacrylamide manufactured by the method of this invention is used when pulp is converted to paper. Its addition has a great effect in improving drainage when water is removed from the paper, and in increasing the mechanical strength of the paper; in particular, it increases the internal bond strength of the paper. In some cases, this effect can be enhanced by the concurrent use of water-soluble anionic resins. In this case, the water-soluble anionic resins that may be used are those containing anionic substituent groups such as carboxyl, sulfonyl or phosphate, or their salts, examples being anionic acrylamide resins, anionic polyvinyl alcohol resins, carboxymethyl cellulose, carboxymethylated starch and sodium alginate.

The method of using the cationic polyacrylamide of this invention as a drainage agent, may be a conventional method known to those skilled in the art. The advantage of this invention, however, is that after the polyacrylamide and short time as described above, they are added to the pulp slurry immediately. In this context, the meaning of the word "immediately" is that, either after the reaction has been stopped or without stopping the reaction, the aqueous solution after the reaction is not removed from the reaction pipes and run off to the outside, but is transported through the same pipes to be added to the pulp slurry. More specifically, the aqueous solution after reaction may be added directly to the pulp slurry through the pipes, or a stock tank may be installed and, after temporary storage in the tank, the quantity added may be regulated. The time spent by the reaction solution in the pipes is not critical provided it does not deteriorate after the reaction. If however this time is too long, the equipment and piping required to store the solution will necessarily be larger, and full benefit cannot be derived from the advantages of this invention. To carry out this invention effectively, therefore, the solution is preferably added within 5 hours, more preferably within 1 hour, and most preferably within 10 minutes after the reaction.

The solution may also be diluted with water depending on the concentration of cationic polyacrylamide after reaction, and then added. The degree of dilution may vary according to the type of pulp and rate of paper-making, but the concentration of cationic polyacrylamide at the time of addition is of the order of 0.1–10 weight %, preferably of the order of 0.5–5 weight %, and more preferably 0.8–2 weight %. The cationic polyacrylamide of this invention may be used alone, but it is preferable if paper-making is carried out with the concurrent use of aluminium sulfate and anionic resins as necessary. These chemicals may be added in any desired order, or they may be added simultaneously. Further, the cationic polyacrylamide and water-soluble anionic resin may also be added after mixing together at a pH of 9 or more. The addition ratio of cationic polyacrylamide to water-soluble anionic resins may be any ratio desired within the range 100:0–10:90 in terms of solid weights The quantities added is respectively 0.005–5 weight %, preferably 0.01–2 weight % based on dry weight of pulp solids. The addition may be carried out before the wet sheet is formed, normally in a location near the paper-machine wire parts. In this way, in this invention, the solution obtained immediately after the Hofmann degradation reaction may be added to the pulp slurry either after stopping the reaction or without stopping it. In both cases the solution may be added without dilution, but it is preferably added after diluting it with water to 0.1–10% polymer solids as necessary.

The method of using the cationic polyacrylamide of this invention as a paper strength agent, may be a conventional method known to those skilled in the art. The cationic polyacrylamide of this invention may be used alone, but paper-making may be carried out with the concurrent use of aluminum sulfate and anionic resins as necessary. These chemicals may be added in any desired order, or they may be added simultaneously. Further, the cationic polyacrylamide and water-soluble anionic resin may also be added after mixing together at a pH of 9 or more. The addition ratio of cationic polyacrylamide to water-soluble anionic resins may be any ratio desired within the range 100:0–10:90 in terms of solid weights. The quantities added respectively 0.005–5 weight %, preferably 0.01–2 weight % with respect to dry weight of pulp solids. The addition may be carried out before the wet sheet is formed, but also after the wet sheet is formed, in particular, when manufacturing multilayered sheet, the addition may also be carried out by spray coating or roll coating. In this invention, a cationic polyacrylamide is manufactured by the Hofmann decomposition of a polyacrylamide at high temperature for a short time. The present inventors have found the surprising fact that this cationic polyacrylamide shows far superior paper strengthening capability than the cationic polyacrylamide obtained by carrying out the same reaction at low temperature for a long period of time. The reason for this is not entirely clear. However if the polyacrylamide is added to pulp slurry or the like without stopping the reaction, its effect is particularly marked, and from this it may be conjectured that N-chloro groups which are reaction intermediates or other functional groups produced by the high temperature contribute directly or indirectly to paper strength. It is therefore more desirable to add the solution without stopping the reaction, however as the solution deteriorates with time if the reaction is not stopped, it is desirable to add it immediately after the reaction.

Paper manufactured by the above method has superior strength. More specifically, it has superior tear strength, internal bond strength, and compressive strength. If therefore this method is employed, it will be extremely effective when used with raw materials containing a high proportion of waste paper beaten from corrugated board or newspaper, and a high strength paper may thus be obtained. It is not however limited to corrugated board or newspaper, and can be used to manufacture paper with superior strength whenever such a paper is desired.

Moreover, an even better paper with internal bond strength, paper inter-layer strength and drainage properties was achieved by using a cationic acrylamide polymer having a copolymer of (meth)acrylamide and acrylonitrile or a copolymer of (meth)acrylamide and N,N-dimethyl (meth)acrylamide as its principal constituent, as compared to a cationic acrylamide polymer having a homopolymer of (meth)acrylamide as its principal constituent.

The cationic polyacrylamide manufactured by the method of this invention is also useful as a flocculant for various kinds of waste water, and is particularly effective in the flocculation and dewatering of organic suspensions such as the raw sewage discharged as daily waste, waste water, and excess sludges such as the activated sludge produced by biotreatment. When the polyacrylamide of this invention is used as a flocculant for waste water and the like, the quantity added in terms of solid matter is usually 0.01–1,000 ppm, preferably 0.1–100 ppm, based on the quantity of waste water, and either the flocculation and sedimentation method or the pressure flotation method may be used. When the polyacrylamide of this invention is used as a dewatering agent for flocculated sediment and sludge, the quantity added as solid matter is usually 0.01-50 weight %, preferably 0.2-10 weight % based on the dry sludge solids. In this case, an aqueous solution of the flocculant is usually added to the sediment or sludge in the flocculation tank and the mixture stirred, or the two may be mixed directly in the pipe, to form a floc which is filtered off and dewatered, various dewatering techniques may be employed such as vacuum dewatering, centrifugal dewatering using a decanter or the like, capillary dewatering, or pressure dewatering using a screw press dewaterer filter press dewaterer or belt press dewaterer.

Apart from the above applications, this invention may, be used in a wide variety of other fields such as water-based paints, water-based films, microcapsules and oil drilling, and as a recovery agent, adhesive, fiber treatment agent, dye processing auxiliary agent or pigment dispersion agent, etc.

The cationic polyacrylamide obtained by the method of this invention, is not only obtained in a short time, but in addition has a superior effect when applied in various industrial fields as has been described above, and as will also be clear from the following examples.

Although it need not be repeated, a cationic polyacrylamide of far superior quality can be manufactured at high temperature in a short-term reaction by the method of this invention, and it therefore evidently also has the following effects:

(1) As the reaction time is very short, the reaction equipment can be made lightweight and compact.
(2) As the reaction equipment can be made compact, it can be installed where the cationic polyacrylamide is used, and the reaction can be put "on line".
(3) A cationic polyacrylamide with a varying degree of cationicity can be manufactured in a short time merely by varying the composition of the reaction solution.
(4) Paper with superior bond strength can also be manufactured.

EXAMPLES

We shall hereafter give some examples of this invention. It should be noted that % refers hereafter to weight % unless otherwise specified.

MANUFACTURING EXAMPLE 1

69.3 g of a 40% aqueous solution of acrylamide, 221.9 g of distilled water and 6.5 g of isopropyl alcohol were introduced into 1l 4-necked flasks equipped with stirrers, reflux condensers, thermometers and nitrogen gas inlet tubes, and heated to 45° C. with stirring while replacing the atmosphere inside the flasks with nitrogen. Next, 0.34 g of a 10% aqueous solution of ammonium persulfate and 0.062 g of a 10% aqueous solution of sodium bisulfite were added, whereupon the polymerization reaction began immediately and the temperature rose to 65° C. Subsequently, the temperature was maintained at 65° C. for 2 hours, whereupon an aqueous solution of polyacrylamide (PAM) containing 10% of polymer and having a Brookfield viscosity of 5,500 cps at 25° C., was obtained.

MANUFACTURING EXAMPLE 2

The same method as in Manufacturing Example 1 was used, except that the starting materials were 63.9 g of a 40% aqueous solution of acrylamide, 4.44 g of N-vinyl pyrrolidone, 229.5 g of distilled water and 2.16 g of isopropyl alcohol. An aqueous solution of a N-vinyl pyrrolidone copolymer PAM containing 10% of polymer and having a Brookfield viscosity of 4,800 cps at 25° C., was obtained.

MANUFACTURING EXAMPLE 3

The same method as in Manufacturing Example 1 was used, except that the starting materials were 62.7 g of a 40% aqueous solution of acrylamide, 4.91 g of N-acryloyl pyrrolidine, 231.2 g of distilled water and 11.8 g of isopropyl alcohol. An aqueous solution of a N-acryloyl pyrrolidine copolymer PAM containing 10% of polymer and having a Brookfield viscosity of 3,050 cps at 25° C., was obtained.

MANUFACTURING EXAMPLE 4

The same method as in Manufacturing Example 1 was used, except that the starting materials were 70.6 g of a 40% aqueous solution of acrylamide, 1.78 g of methacrylamide, 225.2 g of distilled water and 2.51 g of isopropyl alcohol. An aqueous solution of a methacrylamide copolymer PAM containing 10% of polymer and having a Brookfield viscosity of 7,000 cps at 25° C., was obtained.

MANUFACTURING EXAMPLE 5

10.2 g of acrylamide and 1.67 g of styrene were dissolved in 200 ml of dioxane in a 500 ml 4-necked flask equipped with a stirrer, reflux condenser, thermometer and nitrogen gas inlet tube, and then heated to 70° C. with stirring while replacing the atmosphere inside the flask with nitrogen. Next, a benzene solution of azobis isobutyronitrile was added. Stirring was continued at 70° C. for 4 hours, whereupon the solution gradually became a white suspension, and a precipitate was formed. After filtering the precipitate, it was dissolved in distilled water, and methanol added to reprecipitate it. The Brookfield viscosity of a 10% aqueous solution of this polymer constituent was 1,200 cps at 25° C.

MANUFACTURING EXAMPLE 6

The same method as in Manufacturing Example 1 was used, except that the starting materials were 69.3 g of a 40% aqueous solution of acrylamide, 2.30 g of acrylonitrile, 226.0 g of distilled water and 2.4 g of isopropyl alcohol. An aqueous solution of an acrylonitrile copolymer PAM containing 10% of polymer and having a Brookfield viscosity of 9,400 cps at 25° C., was obtained.

MANUFACTURING EXAMPLE 7

The same method as in Manufacturing Example 1 was used, except that the starting materials were 64.9 g of a 40% aqueous solution of acrylamide, 4.03 g of N,N-dimethylacrylamide, 228.6 g of distilled water and 2.49 g of isopropyl alcohol. An aqueous solution of a methacrylamide copolymer PAM containing 10% of polymer and having a Brookfield viscosity of 7,800 cps at 25° C., was obtained.

MANUFACTURING EXAMPLE 8

100 g of oxidized starch was dispersed in 900 g of distilled water in 2l 4-necked flasks equipped with stirrers, reflux condensers, thermometers and nitrogen gas inlet tubes. After heating to 70°-90° C. to dissolve the starch completely, the solution was cooled to 20° C. 50 g of acrylamide, 445 g of distilled water and 5.0 g of isopropyl alcohol were added, and nitrogen gas blown into the reaction solution with stirring for 30 min to completely replace the atmosphere inside the flasks. A solution of 4.5 g of ammonium cerium nitrate in 1N aqueous nitric acid was then added, and the reaction carried out at 20° C. for 1 hour. After the reaction was complete, the solution was adjusted to pH 6.5-7.0 with NaOH. The Brookfield viscosity of a 10% aqueous solution of this polymer constituent was 7,800 cps at 25° C.

EXAMPLE 1

Aqueous solution of the polyacrylamide polymers manufactured in Manufacturing Example 1 was reprecipitated with 10 times their volume of methanol, and 10 g of the dried powdered polyacrylamide polymer was dissolved in 14 g of distilled water. This solution was heated to 80° C., then a mixed solution containing 3.54 g of 12.5% sodium hypochlorite solution, 1.5 g of 30% sodium hydroxide solution, was added in one installment with stirring. After the addition, 20 sec later, 80 g of cool water (2°-5° C.) was added to the reaction mixture, and the reaction was stopped. A colloid titration was then carried out using a 1/400N aqueous solution of potassium polyvinyl sulfonate with toluidine blue as indicator, and the cationicity was measured. Table I shows the results.

EXAMPLES 2-4

The same operations as in Example 1 were carried out on the polyacrylamide polymers manufactured in Manufacturing Examples 2-8 under reaction conditions of 80° C. for 5 sec, 65° C. for 60 sec and 50° C. for 180 sec, and the cationicity was measured in each case. Table I shows the results.

COMPARATIVE EXAMPLES 1-2

The same operations as in Example 1 were carried out on the polyacrylamide polymers manufactured in Manufacturing Examples 1-8 under reaction conditions of 20° C. for 180 sec and 20° C. for 5400 sec, and the cationicity was measured in each case. Table I shows the results.

EXAMPLES 5-7

An aqueous solution of the polyacrylamide polymer manufactured in Manufaoturing Example 1 was reprecipitated with 10 times its volume of methanol, and 1.0 g of the dried powdered polyacrylamide polymer was dissolved in 14 g of distilled water This solution was maintained at 80° C., then a mixed solution containing 3.54 g of 12.5% sodium hypochloride solution, 1.5 g of 30% sodium hydroxide solution, was added in one installment with stirring. After the addition, the cationicity was measured after 5, 20 and 60 sec by the same method as in Examples 1-4. Table II shows the results.

COMPARATIVE EXAMPLES 3-6

An aqueous solution of the polyacrylamide polymer manufactured in Manufacturing Example 1 was reprecipitated with 10 times its volume of methanol, and 1.0 g of the dried powdered polyacrylamide polymer was dissolved in 14 g of distilled water. This solution was maintained at 20° C., then a mixed solution containing 3.54 g of 12.5% sodium hypochlorite solution and 1.5 g of 30% sodium hydroxide solution was added in one installment with stirring. After the addition, the cationicity was measured after 5, 10, 60 and 1800 sec by the same method as in Examples 1-4. Table II shows the results.

COMPARATIVE EXAMPLE 7

An aqueous solution of the polyacrylamide polymer manufactured in Manufacturing Example 1 was reprecipitated with 10 times its volume of methanol, and 1.0 g of the dried powdered polyacrylamide polymer was dissolved in 14 g of distilled water. This solution was maintained at 80° C., then a mixed solution containing 3.54 g of 12.5% sodium hypochlorite solution and 1.5 g of 30% sodium hydroxide solution was added in one installment with stirring. After the addition, the cationicity was measured after 1800 sec by the same method as in Examples 1-4. Table II shows the results.

EXAMPLE 8

An aqueous solution of the polyacrylamide polymer manufactured in Manufacturing Example I was reprecipitated with 10 times its volume of methanol, and 1.0 g of the dried powdered polyacrylamide polymer was dissolved in 34 g of distilled water. This solution was maintained at 80° C., then a mixture of the quantities of i2.5% sodium hypochlorite solution and 30 wt% sodium hydroxide solution specified in Table III (molar ratio - 1:2 and made up to 5 g with distilled water) was added in one installment with stirring. The cationicity was measured 20 sec after the addition by the same method as in Examples 1-4. Further, the anionicity was measured by adding a specified quantity of 1/200N methyl glycol chitosane, and performing a back titration using a 1/400N aqueous solution of potassium polyvinyl sulfonate with toluidine blue as indicator at a pH of

EXAMPLE 9

An aqueous solution of the polyacrylamide polymer manufactured in Manufacturing Example i was reprecipitated with 10 times its volume of methanol, and 1.0 g of the dried powdered polyacrylamide polymer was dissolved in 34 g of distilled water. This solution was maintained at 80° C., then a mixture of 3.54 g of a 12.5% sodium hypochlorite solution and the quantity of 30 wt% sodium hydroxide solution with a molar ratio as specified in Table IV (made up to 5 g with distilled water) was added in one installment with stirring. The cationicity was measured by the same method as in Example i, and the anionicity by the same method as in Example 8. 20 sec after the addition in each case.

PAPER-MAKING EXAMPLE 1

We shall refer to a 1% solution of cationic polyacrylamide prepared as in Example 1 and maintained at a temperature Of no greater than 5° C., as cationic polyacrylamide solution A. Aluminum sulfate was added to a pulp slurry of Canadian Standard Freeness (referred to hereafter as CSF) of 480 ml and 1.0% concentration (electrical conductivity 1.2 ms) obtained by beating waste paper from corrugated board, in the proportion of 2.0% with respect to pulp (based on dry weights, hereafter same), and the mixture stirred for 1 min. Next, a commercial anionic polyacrylamide (Hoplon 3150B, Mirsui Toatsu Chemicals Inc.) was added in the proportion of 0.24% with respect to pulp, and the mixture stirred for 1 min. Cationic polyacrylamide solution A was then added to the pulp slurry in the proportion of 0.36% with respect to pulp, and stirring continued after the addition for 1 min. Part of the resulting pulp slurry was taken to measure CSF according to the method described in JIS P8121, and the remainder was used to make paper in a TAPPI standard sheet machine. The product was then dried in a hot air drier at 110° C. for 1 hour so as to obtain a handmade paper with an areal weight of 125±3 g/m². To evaluate made paper, its "specific rupture strength" was measured according to JIS P8112, and its "internal bond strength" was measured by a Kumagaya Riki Internal Bond Tester. Table y shows the results.

PAPER-MAKING EXAMPLES 2-7

Paper-making tests were carried out by the same method as in Paper-Making Example 1, excepting that the solutions of cationic polyacrylamide manufactured in Examples 2-7 were used. Tables V and VI show the results.

COMPARATIVE PAPER-MAKING EXAMPLE 1

Paper-making test was carried out by the same methods as in Paper-Making Example 1, except that the reaction was carried out at 20° C. for 180 sec. A handmade paper with an areal weight of 125±3 g/m² was obtained. CSF, specific rupture strength and internal bond strength were measured by the same methods as in Paper-Making Example 1.

Table VI summarizes these results.

COMPARATIVE PAPER-MAKING EXAMPLE 2

Paper-Making test was carried out by the same methods as in Comparative Paper-Making Example 1, excepting that the reaction was carried Out at 20° C., 5400 sec. Table VI summarizes these results.

FLOCCULATION EXAMPLE 1

10 g of an aqueous solution of the polyacrylamide manufactured in Manufacturing Example 1 (solids concentration 10 wt%) and 20 g of distilled water were heated to 80° C., then a mixed solution containing 5.31 g of 12.5% sodium hypochlorite solution, 2.25 g of 30% sodium hydroxide solution and 2.44 g of distilled water was added in one installment. 10 sec after this addition, 10 ml of an aqueous solution of 212 mg of sodium sulfite was added, the pH was adjusted to 4.5 with concentrated hydrochloric acid, and the mixture was poured into approximately 10 times its volume of methanol to obtain a precipitate. After filtering the precipitate on a glass filter, it was dried in a vacuum drier at 40° C. for 6 hours so as to obtain a white powder with a cationicity of 7.98 meq/g. We shall refer to a 1% aqueous solution of this powder in distilled water as cationic polyacrylamide solution B. 150 ml of raw sewage and sludge (digested sludge=½, solids 1.45%) was taken in a 300 ml beaker, 20 ml of cationic polyacrylamide solution B was added, and the mixture stirred for 1 min. The resulting flocculent product was filtered in a Buchner funnel by natural tration (filter surface area 100 cm², filter cloth 60 mesh Tetron). The amount of filtrate collected from gravity dewatering was measured at various time intervals, and found to be 106 ml after 10 sec, 108 ml after 20 sec, 110 ml after 30 sec and 112 ml after 60 sec. The floc remaining after gravity dewatering was centrifuged at 3000 rpm for 5 min, and the water content of the dewatered cake obtained was found to be 88%.

TABLE I

| Manufacturing Example | Acrylamide Polymer | Reaction Conditions (temperature/reaction time) | | | | | |
|---|---|---|---|---|---|---|---|
| | | Example | | | | Cationicity Comparative Example | |
| | | 1 80° C./ 30 sec | 2 80° C./ 5 sec | 3 65° C./ 60 sec | 4 50° C./ 180 sec | 1 20° C./ 180 sec | 2 20° C./ 5,400 sec |
| 1 | PAM | 5.15 | 5.10 | | 5.12 | 1.79 | 5.01 |
| 2 | 5 mol % N-vinylpyrolidone copolymer | 4.88 | | | | | 4.82 |
| 3 | 10 mol % N-acryloylpyrolidine copolymer | | 4.78 | | 4.64 | | 4.80 |
| 4 | 5 mol % methacrylamide copolymer | 4.96 | 4.81 | | | 1.76 | 4.98 |
| 5 | 5 mol % styrene coplymer | | 3.64 | | | | 3.66 |
| 6 | 10 mol % acrylonitrile copolymer | 5.07 | 5.02 | | | 1.65 | 5.18 |
| 7 | 10 mol % N,N-dimethylacrylamide copolymer | 5.01 | 4.96 | | | 1.48 | 5.10 |
| 8 | 50% acrylamide graft starch | | 2.73 | 2.80 | | 0.91 | 2.82 |

Polymer concentration during reation: 5 wt %
NaOCl concentration at time of addition: 0.28 mol/l
NaOH concentration at time of addition: 0.56 mol/l

TABLE II

| | Examples | | | Comparative Examples | | | | |
|---|---|---|---|---|---|---|---|---|
| | 5 | 6 | 7 | 3 | 4 | 5 | 6 | 7 |
| Reaction temperature (°C.) | 80 | 80 | 80 | 20 | 20 | 20 | 20 | 20 |
| Reaction time (sec) | 5 | 20 | 60 | 5 | 10 | 60 | 1,800 | 1,800 |
| Cationicity (meq/g) | 5.09 | 5.14 | 5.01 | 0.06 | 0.12 | 0.22 | 3.35 | 2.03 |

Polymer concentration during reaction: 5 wt %
NaOCl concentration at time of addition: 0.28 mol/l
NaOH concentration at time of addition: 0.56 mol/l

TABLE III

| Quantity of NaOCl added, 1) | 10 mol % | 20 mol % | 30 mol % | 50 mol % | 100 mol % |
|---|---|---|---|---|---|
| Cationicity (meq/g) | 1.29 | 2.58 | 3.89 | 5.73 | 7.88 |

TABLE III-continued

| Anionicity (meq/g) | 0.25 | 1.30 | 1.70 | 0.95 | 0.72 |
|---|---|---|---|---|---|

1) The quantity of NaOCl added is expressed in mol % based on the acrylamide groups of the polyacrylamide
Reaction temperature: 80° C.
Reaction time: 20 sec

TABLE IV

| NaOH/NaOCl (molar ratio) | 4/1 | 2/1 | 0.8/1 | 0.6/1 | 0.4/1 |
|---|---|---|---|---|---|
| Cationicity (meq/g) | 5.29 | 5.10 | 4.93 | 4.85 | 1) |
| Anionicity (meq/g) | 1.12 | 0.98 | 0.86 | 0.51 | 1) |

1) Gelation
Polymer concentration during reaction: 2.5 wt %
NaOCl concentration at time of addition is fixed at 0.14 mol/l
Reaction temperature: 80° C.
Reaction time: 20 sec

TABLE V

| Paper-Making Example | | CSF (ml) | Specific Rupture Strength | Internal Bond Strength |
|---|---|---|---|---|
| 1 | PAM 80° C./20 sec | 668 | 2.45 | 3.27 |
| 2 | 5 mol % N-vinylpyrrolidone copolymer | 670 | 2.48 | 3.23 |
| 6 | 10 mol % acrylonitrile copolymer | 711 | 2.40 | 3.92 |
| 7 | 10 mol % N,N-dimethylacrylamide copolymer | 706 | 2.43 | 3.68 |

TABLE VI

Reaction Condition (temperature/reaction time)

| | Paper-Making Examples | | | Comparative Paper-Making Example | |
|---|---|---|---|---|---|
| | 3 | 4 | 5 | 1 | 2 |
| | 80° C./ 5 sec | 65° C./ 60 sec | 50° C./ 180 sec | 20° C./ 180 sec | 20° C./ 5,400 sec |
| CSF (ml) | 660 | 658 | 665 | 502 | 635 |
| Specific rupture strength | 2.40 | 2.53 | 2.44 | 1.71 | 2.32 |
| Internal bond strength (kg/cm) | 3.15 | 3.02 | 3.21 | 1.50 | 2.75 |

Polymer concentration during reaction: 2.5 wt %
NaOCl concentration at time of addition: 0.14 mol/l
NaOH concentration at time of addition: 0.28 mol/l
Paper-making conditions:-
Aluminum sulfate: 0.5%
Anionic paper strength agents: 0.24%
Hofmann decomposition PAM: 0.36%
(each % based on pulp)

What is claimed is:

1. Paper prepared using a cationic acrylamide polymer made by a method which comprises reacting an acrylamide polymer and a hypohalogenite under alkaline conditions as a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C.

2. Paper prepared using a cationic acrylamide polymer made by a method which comprises reacting an acrylamide polymer and a hypohalogenite under alkaline conditions at a pH of at least 11 for the specified short reaction time, t(sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C., said copolymer containing:
 (a) 97-60 mol % of (meth)acrylamide units
 (b) 3-40 mol % of acrylonitrile units.

3. Paper prepared using a cationic acrylamide polymer made by a method which comprises reacting an acrylamide copolymer and a hypohalogenite under alkaline conditions at a pH of at least about 11 for the specified short reaction time, t(sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C., said copolymer containing:
 (a) 97-60 mol % of (meth)acrylamide units
 (b) 3-40 mol % of N,N-dimethyl(meth)acrylamide units.

4. A method of strengthening paper comprising adding a cationic acrylamide polymer to a paper slurry, said cationic acrylamide polymer being made by a method which comprises reacting an acrylamide polymer and a hypohalogenite under alkaline conditions at a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C.

5. The method of claim 4 wherein an anionic resin is added with the cationic acrylamide polymer.

6. A method of strengthening paper comprising adding a cationic acrylamide polymer to a paper slurry, said cationic acrylamide polymer being made by a method which comprises reacting an acrylamide polymer and a hypohalogenite under alkaline conditions at a pH of at least 11 for the specified short reaction time, t (sec);

$$t(\text{sec}) \geq e^{\frac{15,150}{273+T}} \times 2.5 \times 10^{-20}$$

-continued $$t(\text{sec}) \leq e^{\frac{15,150}{273+T}} \times 10^{-18} + 30$$

where T is reaction temperature (°C) and 50° C.$\leq$T$\leq$110° C., said copolymer containing:

(a) 97-60 mol % of (meth)acrylamide units (b) 3-40 mol % of acrylonitrile units.

7. The method claim 6 wherein an anionic resin is added with the cationic acrylamide polymer.

8. A method of strengthening paper comprising adding a cationic acrylamide polymer to a paper slurry, said cationic acrylamide polymer being made by a method which comprises reacting an acrylamide polymer and a hypohalogenite under alkaline conditions at a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C., said copolymer containing:

(a) 97-60 mol % of (meth)acrylamide units (b) 3-40 mol % of N,N-dimethyl(meth)acrylamide units.

9. The method claim 8 wherein an anionic resin is added with the cationic acrylamide polymer.

10. A method of strengthening paper comprising adding a cationic acrylamide polymer on paper, said cationic acrylamide polymer being made by a method which comprises reacting an acrylamide polymer and a hypohalogenite underalkaline conditions at a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C.

11. The method claim 10 wherein an anionic resin is added with the cationic acrylamide polymer.

12. A method of strengthening paper comprising adding a cationic acrylamide polymer on paper, said cationic acrylamide polymer being made by a method which comprises reacting an acrylamide polymer and a hypohalogenite underalkaline conditions at a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C., said copolymer containing:

(a) 97-60 mol % of (meth)acrylamide units (b) 3-40 mol % of acrylonitrile units.

13. The method claim 12 wherein an anionic resin is added with the cationic acrylamide polymer.

14. A method of strengthening paper comprising adding a cationic acrylamide polymer on paper, said cationic acrylamide polymer being made by a method which comprises reacting an acrylamide polymer and a hypohalogenite underalkaline conditions at a pH of at least 11 for the specified short reaction time, t (sec);

$$t(\text{sec}) \geq e^{\frac{15,150}{273+T}} \times 2.5 \times 10^{-20}$$

$$t(\text{sec}) \leq e^{\frac{15,150}{273+T}} \times 10^{-18} + 30$$

where T is reaction temperature (°C) and 50° C.$\leq$T$\leq$110° C., said copolymer containing:

(a) 97-60 mol % of (meth)acrylamide units (b) 3-40 mol % of acrylonitrile units.

15. The method claim 14 wherein an anionic resin is added with the cationic acrylamide polymer.

* * * * *

UNITED STATES PATENT AND TRADEMARK OFFICE
CERTIFICATE OF CORRECTION

PATENT NO. : 5,292,821
DATED : March 8, 1994
INVENTOR(S) : Takaki et al.

It is certified that error appears in the above-identified patent and that said Letters Patent is hereby corrected as shown below:

Claim 1, column 17, line 49, "as" should be --at--.

Claim 10 column 19, line 37, "adding" should be --coating--;

line 40, "underalkaline" should be --under alkaline--.

Claim 12, column 20, line 10, "adding" should be --coating--;

line 13, "underalkaline" should be --under alkaline--;

line 14, after "least" insert --about--.

Claim 14, column 20, line 29, "adding" should be --coating--;

line 32, "underalkaline" should be --under alkaline--;

line 333, after "least" insert --about--.

Signed and Sealed this

Thirteenth Day of September, 1994

*Attest:*

BRUCE LEHMAN

*Attesting Officer*     *Commissioner of Patents and Trademarks*